United States Patent [19]
Ghosh et al.

[11] Patent Number: 5,658,030
[45] Date of Patent: Aug. 19, 1997

[54] TROLLEY WHEELS

[75] Inventors: Syamal K. Ghosh; John R. Duford, both of Rochester; David R. Ramble, Hilton; Mark S. Kohler, Spencerport, all of N.Y.

[73] Assignee: Eastman Kodak Company, Rochester, N.Y.

[21] Appl. No.: 606,672

[22] Filed: Feb. 26, 1996

[51] Int. Cl.[6] .................................................. B60B 17/02
[52] U.S. Cl. ........................ 295/1; 295/8; 301/64.7; 152/323; 16/107
[58] Field of Search ............................. 301/5.1, 64.7; 152/323, 324, 325, 326, 327, 328, 329, 393, 394; 295/1, 8, 11; 16/45, 107; 104/89, 94, 95; 492/28, 60

[56] References Cited

U.S. PATENT DOCUMENTS

| | | |
|---|---|---|
| 2,497,224 | 2/1950 | Laure . |
| 3,199,364 | 8/1965 | Dew . |
| 3,578,812 | 5/1971 | Ladue et al. . |
| 4,019,789 | 4/1977 | Rosin et al. . |
| 4,049,308 | 9/1977 | Martin ........................... 295/8 |
| 4,071,279 | 1/1978 | Chung . |
| 4,531,785 | 7/1985 | Perkins . |
| 4,535,827 | 8/1985 | Seaford . |
| 5,026,106 | 6/1991 | Biermann . |

*Primary Examiner*—Russell D. Stormer
*Attorney, Agent, or Firm*—Susan L. Parulski

[57] ABSTRACT

Trolley wheels and guide rollers for a monorail trolley system and a method for reducing debris originating from trolley wheels and guide rollers particularly in the production environment of producing iron-sensitive photographic materials.

5 Claims, 3 Drawing Sheets

TROLLEY WHEELS

FIELD OF THE INVENTION

This invention relates in general to wheels for equipment which moves heavy loads, such as a monorail trolley system. More particularly, this invention relates to wheels for monorail trolley systems which are used to convey rolls of polymeric webs from one place to another on production floors in a manufacturing environment which must be contamination free.

BACKGROUND OF THE INVENTION

The prior art provides various wheels for use in the various industries designed to satisfy the requirements presented by the environment within which such wheels are used and the vehicles to accomplish desired objectives. The variety of such wheels is illustrated by the following patents.

U.S. Pat. No. 2,497,224 discloses a roller wheel composed of a synthetic resin impregnated with resilient filler material and a dry lubricant for use with drawers in metal equipment.

U.S. Pat. No. 3,199,364 relates to composite gears, sprockets and pulleys formed by injection molding of different plastic materials without metal components therein.

U.S. Pat. No. 3,578,818 pertains to a rubber tire attached to a plastic molded wheel by various attaching, interlocking elements so that the two components cannot separate under operating conditions by skid, lateral or radial forces or flexing of the tire under load.

U.S. Pat. No. 4,019,789 relates to a plastic-metallic trolley wheel assembly used in the food processing industry where high heat and moisture conditions exist and the trolley wheel assembly must bear high loads. The assembly comprises: a plastic fire or trolley wheel having a central opening and an annular outer metallic bearing race positioned on the wheel adjacent to the opening. Means are provided to hold the wheel and the metallic bearing race to prevent separation thereof.

U.S. Pat. No. 4,071,279 describes a solid polyurethane tire suitable for use on vehicles adapted for transportation of goods within industrial manufacturing plant facilities. The polyurethane is prepared by reacting a complex of 4,4'-methylene dianiline and a salt with a prepolymer of selected diisocyanates and selected polyester polyols and polyethylene polyols.

U.S. Pat. No. 4,535,827 discloses a molded shock-absorbing wheel assembly used in the automotive industry in assembly line operations, the wheel assembly comprising: a cast iron annular core member disposed concentrically about a bearing seat; and a plastic material, such as polyurethane covering the core member. Means are included to prevent relative sliding movement between the core and the plastic material.

The present invention concerns the reduction or elimination of iron and other metals, the presence of which in the working environment where photographic film base is produced adversely affects the film base. In particular, the invention concerns the replacement of steel wheels with plastic clad steel wheels for monorail trolley systems which are used to convey rolls of polymeric webs such as acetate and polyester webs which require extreme cleanliness during the manufacture and moving from one place to another on production floors.

The problems associated with the production of photographic film base will be appreciated from a brief description of such production. Photographic emulsions are coated on polymeric webs such as acetate and polyester for support. The polymer supports are manufactured in wide webs which are coiled into a roll weighing more than 1000 lb. each. A multiple of these rolls is carried by a monorail trolley from the web manufacturing location to a succession of manufacturing stations. At the final stage, photographic emulsions are applied onto the supports. Extreme care must be taken during all the steps of manufacturing process and the web handling so that the final product is clean and defect-free. Furthermore, extreme caution must be taken to insure that photo active particles do not contaminate the products. Iron and iron compounds, aluminum, and silicone are some examples of photo-active contaminants.

There are many moving and stationary components in a monorail system that are made of steel. Wear debris and corrosion products of those components are the source of detrimental iron and iron compounds. The largest amounts of iron debris are produced when the steel wheels of trolleys slide over the stationary monorail track at a speed greater than 30 feet per minute. Although extreme care is taken to clean the rail tracks, wheels and other components of monorail trolleys, it is difficult to completely eliminate contamination. In a typical manufacturing operation there are eight load bearing cast steel wheels in each trolley carrying more than 4000 lbs. of photographic support rolls. The loaded trolleys typically move at speeds greater than 30 feet per minute over the stationary rails and generate a great deal of wear debris. In addition, there are generally sixteen steel guide rollers in each trolley that ride against the edge of the rail generating additional iron debris.

Steel is a very common engineering material for constructing heavy equipment such as monorail trolleys. It is difficult to substitute steel with other engineering materials cost-effectively without sacrificing robustness. Since neither the rails nor the wheels can be lubricated to reduce or eliminate wear, the task of eliminating iron contamination is extremely difficult. Furthermore, as indicated, other engineering materials such as aluminum, copper or brass cannot be used since they are photo-active.

The prior art offered no satisfactory solution to these problems.

SUMMARY OF THE INVENTION

Applicants have discovered that metallic contamination to photographic film base can be prevented in the production environment by providing and using on material transporting equipment trolley wheels each of which comprises:
a stainless steel hub portion including a ball bearing unit therin; and a cover supported by said stainless steel hub portion including a poly amide-imide plastic material having:
a specific gravity of from about 1.40 to 1.41;
a tensile strength at 73° F. of from about 16 to 21.5 ksi;
a percent elongation of from about 5–18 at 73° F.; and
a Rockwell hardness at 73° F. of from about M114 to M124.

In the preferred embodiment of the trolley wheel of the present invention the hub of the wheel is cast with about a ½ inch thick outer ring of poly amide-imide having a hardness of about 90 Shore A durometer.

In the preferred embodiment of the guide roller of the present invention the hub of the wheel is cast with about ¼–1 inch thick outer ring of polyurethane.

DETAILED DESCRIPTION OF THE DRAWINGS

The present invention provides a monorail carrier comprising trolley wheels and guide rollers for carrying heavy loads in a production facility.

Figure 1:
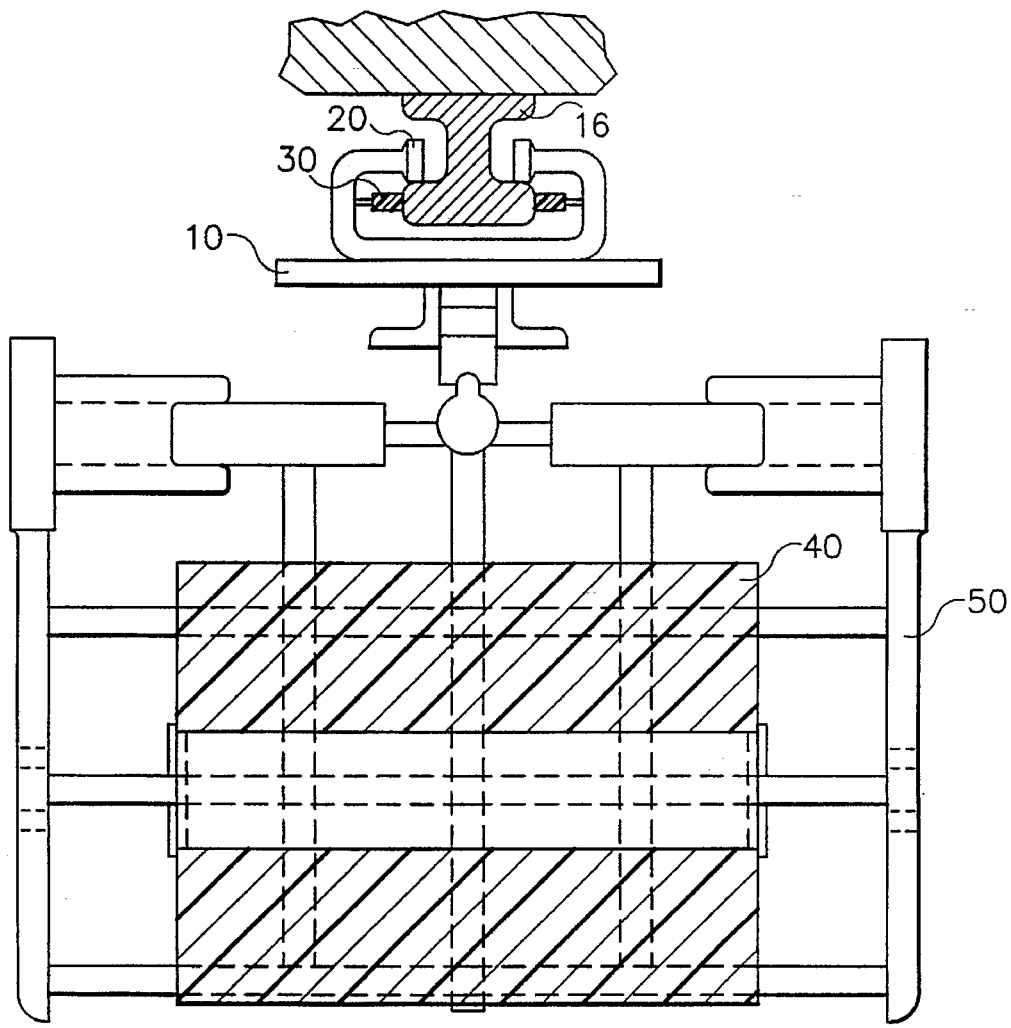
FIG. 1 shows a monorail carrier.

FIG. 1 shows a monorail carrier which comprises: an overhead monorail trolley 10 which rides on a steel I-beam 16 anchored on the ceiling. The monorail trolley 10 is equipped with stainless steel wheels clad with TORLON ® tire 20 and guided by cast polyurethane guide rollers 30. The monorail trolley 10 is equipped with a steel carrier 50 which is adjustable and can carry acetate or other polymeric rolls 40 of various diameters. The loaded monorail trolley is moved manually from one station to another on the production floor.

Figure 2:
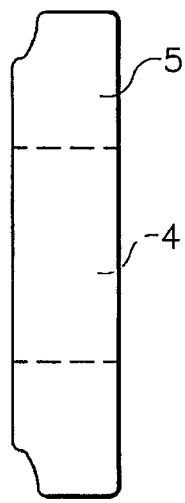
FIG. 2 shows, in cross-section, the construction of a prior art steel wheel.

FIG. 2 shows, in cross-section, the construction of a prior art steel wheel wherein 4 is a ball bearing and 5 is the steel wheel.

In the production environment of photographic film base the contributing factors in metallic contamination, mainly iron contamination, are the debris of wear from the moving steel components. To eliminate iron contamination, stress calculation and experiments were performed on various plastic materials with the intention of substituting them for iron in monorail trolley wheels and guide rollers on which monorail trolley wheels travel between work stations.

Theoretical calculations and experiments revealed that solid engineering plastic wheels would not be able to carry the load without premature failure. Prototype solid engineering plastic wheels were built using selected plastics which by theoretical calculations were the most promising to withstand stress. Selected plastic materials included Ultra High Molecular Weight Polyethylene (UHMWPE), poly amide-imide (sold under the tradename TORLON® of Amoco Chemicals Corporation), a cotton fabric reinforced phenolic resin laminate (sold under the tradename SPAULDITE®), and similar plastics. Testing was conduced using a standard ASTM G-77 block-on-ring test equipment and procedure schematically shown in FIG. 4. AISI 4620 hardened steel blocks (HRC 58–60) was used to simulate the stationary rail and the candidate plastic rings to simulate the wheels. The rings were rotated at 85 revolutions per minute (rpm) (which is equivalent to 30 ft/min.) with a normal load of 150 pounds (lbs) (which is equivalent to a total loading of 4100 lb.).

All plastic materials, which by theoretical calculations appeared to be promising, failed in the prototype testing.

Figure 3:
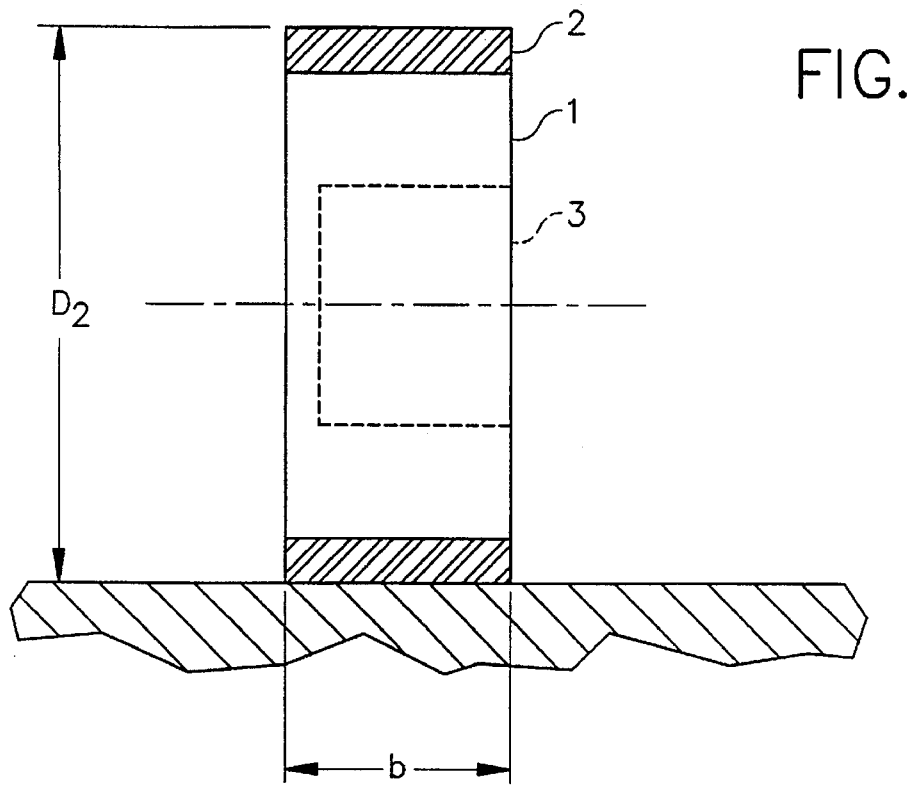
FIG. 3 shows a theoretical model used for calculating stress on the poly amide-imide clad steel wheel of the present invention.

A theoretical model was used to calculate the stress on plastic clad steel wheels, in which the load carrying requirements of the monorail trolley were taken into consideration. The model was as follows and is illustrated in FIG. 3.

Total load requirement (P) was 4100 lb. shared 50% by each of the eight wheels on the monorail trolley. The 50% sharing is due to the fact that only half the width of the wheels contact the steel overhead tracks. Other parameters are as follows.

Loading on each wheel=1025 lb.

Outer Diameter ($D_2$)=4 inch

Width of each wheel (b)=0.7 inch

Load per linear inch, p=P/b=1464 lb./inch

E steel (Modulus of Elasticity)=$30 \times 10^6$ psi and

E plastic=Ep

Poisson's ratio, vsteel=vplastic=0.3

Maximum stress concentration, $\sigma_c$=0.798 $\sqrt{p/KdCe}$ where

Kd=D and $$Ce=(1-vsteel^2)/Esteel+(1-vplastic^2)/Eplastic \quad \text{(Equation 1)}$$

Figure 4:
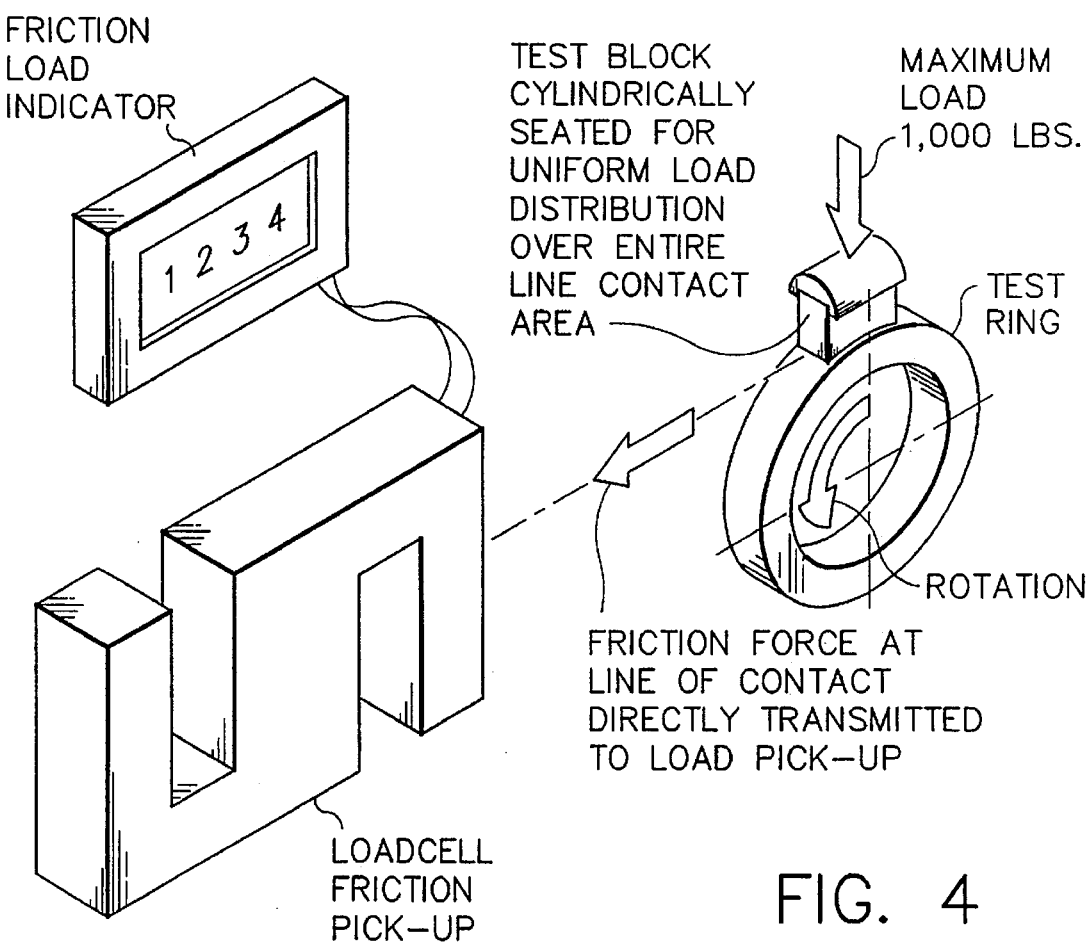
FIG. 4 depicts a test schematic.
Figure 5:
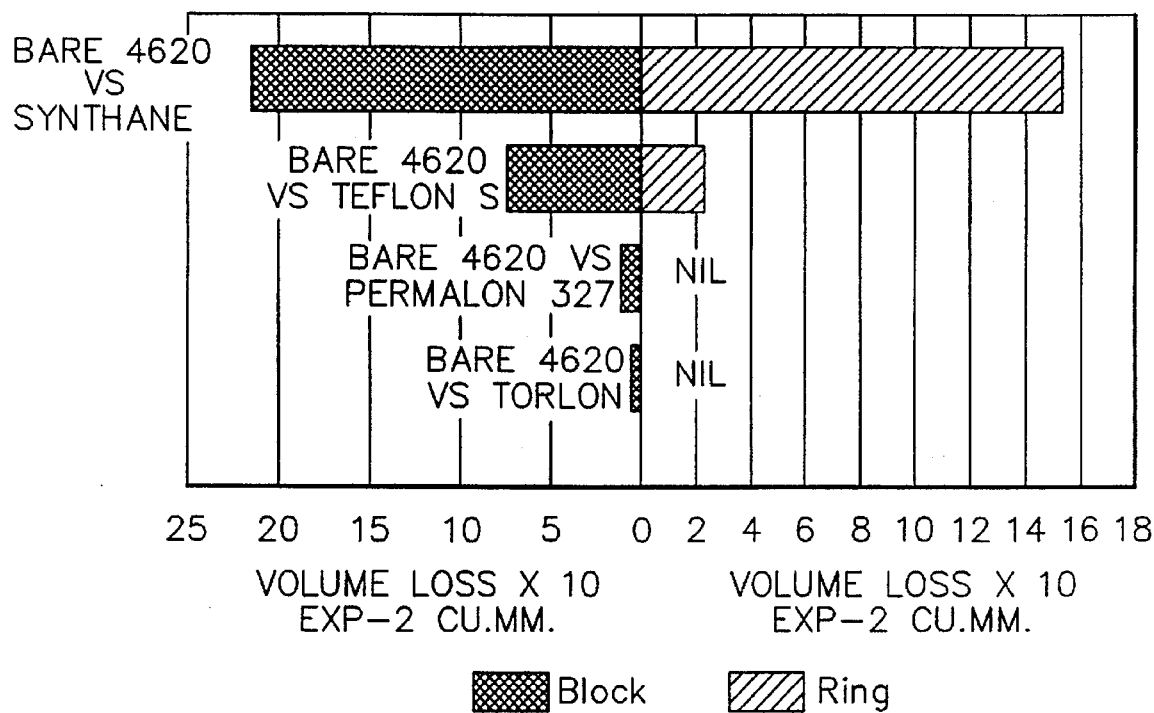
FIG. 5 shows experimental results derived from testing several materials.

Maximum stress concentration for each selected plastic was calculated and matched against the yield strength, Ys. If Ys of the plastic far exceeded the maximum stress concentration, the plastic material was used for laboratory testing. Depending on the laboratory test results, prototypes of plastic wheels were made and tested on the production trolleys. FIG. 4 depicts the test schematic conducted according to ASTM G-77; while FIG. 5 shows the experimental results.

Among the various polymers tested, TORLON® 4301 was thought to be the polymer of choice. TORLON® 4301 is a poly (amide-imide) polymer containing graphite reinforcement to improve the modulus and yield strength. TORLON® 4301 is a registered trademark of Amoco Chemicals Corp. and the polymer covered thereby is designed and recommended for bearing and wear applications. The graphite contained in the polymer acts as a good solid lubricant.

TORLON® 4203 is also a poly (amide-imide) polymer without containing graphite.

The properties of TORLON® 4301 and TORLON® 4203 are as shown:

| PROPERTY | TORLON ® 4203 | TORLON ® 4301 |
| --- | --- | --- |
| Specific Gravity (g/cc) | 1.40–1.41 | 1.39–1.41 |
| Tensile Strength, 73° F.(ksi) | 16–21.5 | 12–18.6 |
| Elongation, 73° F.(%) | 5–18 | 5–8 |
| Hardness, Rockewell, 73° F. | M114–M124 | M101–M11 |

The following examples will further illustrate the present invention along with comparative examples using plastic-steel combinations which failed in testing.

EXAMPLE 1

TORLON® 4203: $E_p$=$0.75 \times 10^6$ psi and Ys=26.9 kpsi. Using Equation 1

σ=13.8 kpsi which is <Ys, TORLON® was acceptable for laboratory testing.

Laboratory testing showed that TORLON® ring vs. steel block performed better than the control test, i.e. steel vs. steel. The result is shown in FIG. 5.

Figure 6:
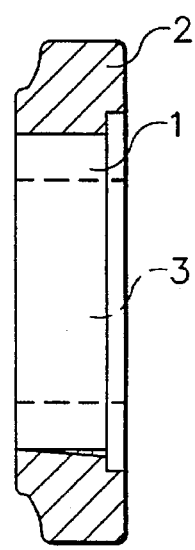
FIG. 6 shows a schematic cross-section of the poly amide-imide clad stainless steel wheel according to the present invention.

Based on this excellent result, prototypes were built using AISI 316 stainless steel hub and TORLON® as the outer ring as shown in the schematic cross-section in FIG. 6, wherein:

1 denotes the stainless steel hub;

2 denotes the TORLON® 4203 cladding; and 3 denotes the ball bearing.

The prototype wheels were then placed in the production environment for life test. The prototypes outperformed steel wheels and the presence of iron debris originating from the wheels were either eliminated completely or drastically reduced.

COMPARATIVE EXAMPLE 2

TORLON® 4301 containing 30% graphite: $E_p=2.8\times 10^6$ psi and $Y_s=29.8$ kpsi.

Calculated $\sigma_c =26.2$ kpsi which is $<Y_s$.

Based on this analysis, prototype wheels were prepared using AISI 316 stainless steel hub and TORLON® 4301 containing 30% graphite as the outer ring. The prototype wheels were then placed in the service for life test. The result was disappointing: the plastic cladding chipped off and were not usable after a few weeks in service. It is surprising that TORLON® 4301 containing 30% graphite had better yield strength yet failed in the life test, while TORLON® 4203 without graphite which had a marginal yield strength performed well in the life test.

The premature failure of TORLON® 4301 may be attributed to its brittleness as evidenced by lower tensile strength and lower percent of elongation.

As indicated earlier, the sources of metal contamination in the production environment are the monorail trolley wheels and the monorail guide rollers. Having found the excellent combination of stainless steel and TORLON® 4203 for use in monorail trolley wheels, experiments were performed to eliminate the source of metal debris that originate from the monorail guide rollers. For replacing/modifying guide rollers, high impact resistant plastics, like ultrahigh molecular weight polyethylene (UHMWPE) were considered because the guide rollers are subjected to severe impact during maneuvering trolleys through several sharp corners on the production floors. Although theoretical calculations predicted that solid UHMWPE would be a good substitute for cast steel as guide rollers, the prototypes produced, and tried on the product floor, failed. Numerous other plastic materials have been tried but failed in life service.

COMPARATIVE EXAMPLE 3

Several prototype solid plastic guide rollers using UHMWPE were placed in a trolley for life test. The prototypes had a very short service life because of cracking and chipping.

EXAMPLE 4

Figure 7:
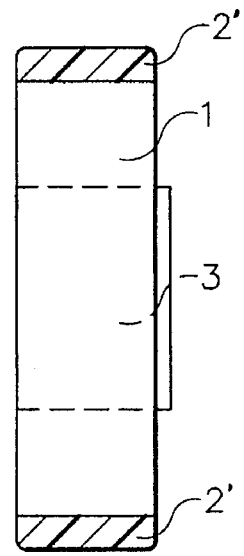
FIG. 7 shows a schematic cross-section of a guide roller used in conjunction with the poly amide-imide clad stainless steel wheel of the present invention.

Prototype guide rollers shown in FIG. 7 were constructed using ball bearing 3, AISI 316 stainless steel hub 1 and cast polyurethane rim 2' on the outer diameter of the stainless steel hub. The outside diameter was machined and brought to the required specifications. The prototypes did extremely well in service and greatly reduced iron contamination originating from guide rollers.

While the present invention having been specifically directed for use in conjunction with production of photographic emulsions where reduction/elimination of metal debris is very important, it is to be understood that the invention may be used in other production floor environments where heavy loads are carried from one work station to another.

It will also be understood that while the preferred embodiment of the invention has been described, variations may be made thereto without departing from the spirit of the invention.

What is claimed is:

1. A trolley wheel comprising:
    a stainless steel hub portion including a ball bearing unit therein; and a
    cover supported by said stainless steel hub portion including a poly amide-imide plastic material having:
        a specific gravity of from about 1.40 to 1.41;
        a tensile strength at 73° F. of from about 16 to 21.5 ksi;
        a percent elongation of from about 5–18 at 73° F.; and
        a Rockwell hardness at 73° F. of from about M114 to M124.

2. The trolley wheel according to claim 1 wherein said poly amide-imide plastic is cast onto said stainless steel hub.

3. A monorail trolley apparatus for carrying heavy loads in a production facility, comprising:
    at least one trolley wheel including a stainless steel wheel hub portion having a ball bearing unit therein, and a cover supported by said stainless steel wheel hub portion made of a poly amide-imide plastic material having a specific gravity of from about 1.40 to 1.41, a tensile strength at 73° F. of from about 16 to 21.5 ksi, a percent elongation of from about 5–18 at 73° F., and a Rockwell hardness at 73° F. of from about M114 to M124; and
    at least one guide roller having a stainless steel roller hub portion containing a ball bearing unit therein, said stainless steel roller hub portion clad by polyurethane.

4. The monorail trolley apparatus according to claim 3 wherein said polyurethane is cast onto said stainless steel roller hub portion of said guide roller.

5. A method of reducing iron contamination originating from a trolley wheel in the production environment of producing iron-sensitive photographic materials, said method comprising the steps of:
    coating a stainless steel wheel hub portion around a ball bearing portion of the trolley wheel; and
    cladding by casting said stainless steel wheel hub portion with a poly amide-imide plastic material having:
        a specific gravity of from about 1.40 to 1.41;
        a tensile strength at 73° F. of from about 16 to 21.5 ksi;
        a percent elongation of from about 5–18 at 73° F.; and
        a Rockwell hardness at 73° F. of from about M114 to M124.

* * * * *

UNITED STATES PATENT AND TRADEMARK OFFICE
CERTIFICATE OF CORRECTION

PATENT NO. : 5,658,030
DATED : August 19, 1997
INVENTOR(S) : Syamal K. Ghosh, et al It is certified that error appears in the above-identified patent and that said Letters Patent is hereby corrected as shown below:

On the title page, insert:
--Related U.S. Application Data
Item: [60] Provisional Application No. 60/004,226 September 25, 1995.--

Column 1, line 2 --CROSS REFERENCE TO RELATED APPLICATION
after the title, insert Reference is made to and priority claimed from U.S. Provisional Application Serial No. US 60/004,226, filed 25 September 1995, entitled TROLLEY WHEELS.--

Signed and Sealed this

Second Day of December, 1997

Attest:

BRUCE LEHMAN

Attesting Officer    Commissioner of Patents and Trademarks